(12) United States Patent
Hayasaka

(10) Patent No.: US 11,472,908 B2
(45) Date of Patent: Oct. 18, 2022

(54) LATEX COMPOSITION

(71) Applicant: ZEON CORPORATION, Tokyo (JP)

(72) Inventor: Kentaro Hayasaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 56 days.

(21) Appl. No.: 16/957,479

(22) PCT Filed: Jan. 10, 2019

(86) PCT No.: PCT/JP2019/000548
§ 371 (c)(1),
(2) Date: Jun. 24, 2020

(87) PCT Pub. No.: WO2019/139087
PCT Pub. Date: Jul. 18, 2019

(65) Prior Publication Data
US 2021/0070907 A1 Mar. 11, 2021

(30) Foreign Application Priority Data
Jan. 12, 2018 (JP) .............................. JP2018-003108

(51) Int. Cl.
C08F 236/14 (2006.01)
D06N 3/00 (2006.01)
(Continued)

(52) U.S. Cl.
CPC .......... *C08F 236/14* (2013.01); *C08F 236/06* (2013.01); *C08F 236/12* (2013.01); *C08K 3/06* (2013.01); *C08K 5/0091* (2013.01); *C08K 13/02* (2013.01); *C08L 9/04* (2013.01); *C08L 13/02* (2013.01); *D06N 3/0006* (2013.01); *D06N 3/0011* (2013.01); *D06N 3/0034* (2013.01); *D06N 3/0088* (2013.01); *D06N 3/10* (2013.01); *C08K 2003/2241* (2013.01); *C08K 2003/2296* (2013.01); *D06N 2201/0263* (2013.01); *D06N 2209/1685* (2013.01); *D06N 2211/103* (2013.01)

(58) Field of Classification Search
USPC .............................................. 526/86; 524/821
See application file for complete search history.

(56) References Cited

U.S. PATENT DOCUMENTS 6,841,623 B2 * 1/2005 Guerin ...................... C08L 9/02
525/230
2014/0115751 A1 5/2014 Saito et al.

FOREIGN PATENT DOCUMENTS

JP H06-101196 A 4/1994
JP 2014-111853 A 6/2014

OTHER PUBLICATIONS

Machine translation of Detailed Description of JP 2008-024897A, published Feb. 2008, retrieved from ESPACENET on Mar. 22, 2022. (Year: 2008).*

(Continued)

*Primary Examiner* — Fred M Teskin
(74) *Attorney, Agent, or Firm* — Oliff PLC

(57) ABSTRACT

A latex composition having a nitrile rubber containing an $\alpha,\beta$-ethylenically unsaturated nitrile monomer unit and a conjugated diene monomer unit, wherein the nitrile rubber has a weight average molecular weight of 50,000 to 100,000, and the weight of methanol extractables in all solids present in the latex composition is 2 to 20 wt % based on the weight of all the solids.

5 Claims, 1 Drawing Sheet

(51) Int. Cl.
*D06N 3/10* (2006.01)
*C08L 13/02* (2006.01)
*C08K 5/00* (2006.01)
*C08K 13/02* (2006.01)
*C08L 9/04* (2006.01)
*C08F 236/12* (2006.01)
*C08F 236/06* (2006.01)
*C08K 3/06* (2006.01)
*C08K 3/22* (2006.01)

(56) References Cited

OTHER PUBLICATIONS

Apr. 2, 2019 International Search Report issued in International Patent Application No. PCT/JP2019/000548.
May 25, 2022 Third Party Observation from European Patent Application No. 19738735.0.
Jun. 17, 2022 Office Action issued in European Patent Application No. 19738735.0.

* cited by examiner

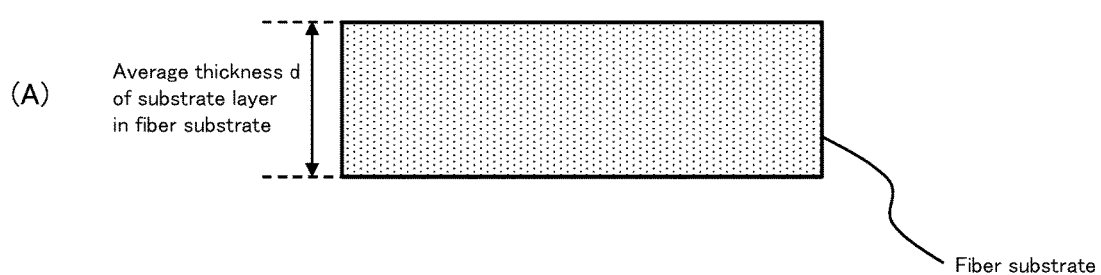
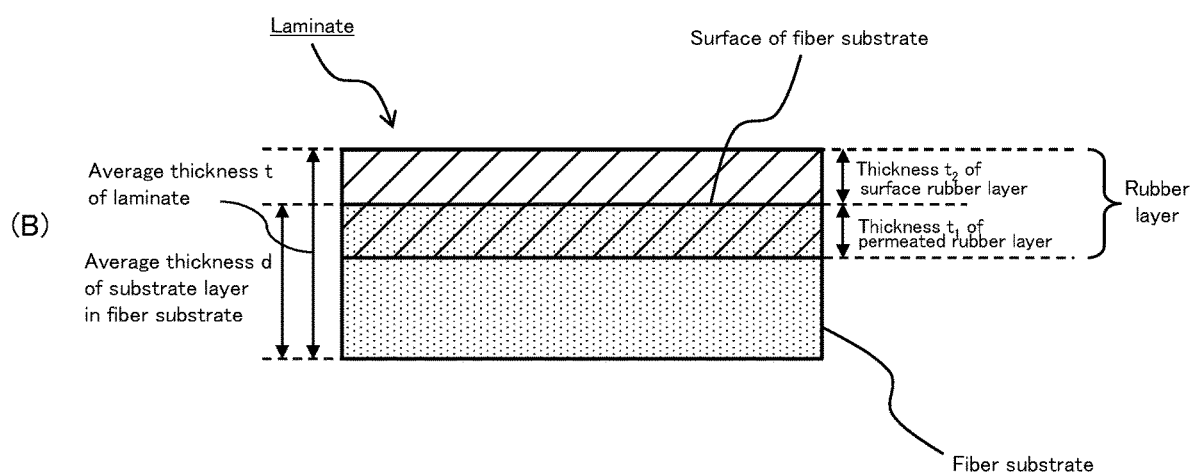

LATEX COMPOSITION

TECHNICAL FIELD

The present invention relates to a latex composition containing a nitrile rubber.

BACKGROUND ART

Conventionally, protective gloves whose solvent resistance, grip properties, wear resistance, and the like have been improved by coating fiber gloves with rubber, resin, or the like have been used as work gloves in various applications, such as manufacturing work in factories, light work, construction work, agricultural work, and the like.

For example, Patent Document 1 discloses a protective glove in which elastic yarns are knitted at least in a wrist portion and the elastic yarns are coated with rubber or resin.

RELATED ART DOCUMENTS

Patent Documents

Patent Document 1: Japanese Patent Laid-Open No. 2014-111853

SUMMARY OF THE INVENTION

Problem to be Solved by the Invention

A problem of existing protective gloves is that their surface rubber layer easily wears out with repeated use. One possible strategy to improve wear resistance is to form a thick rubber layer. This strategy, however, results in a glove which is likely to have cracks and has poor flexibility.

The present invention is completed in view of solving the above problems. It is an object of the present invention to provide a latex composition which provides a laminate having few or no cracks on the surface and having excellent flexibility and wear resistance.

Means for Solving Problems

As a result of intensive studies to achieve the above purpose, the present inventor has found that a laminate with a rubber layer which is less likely to have cracks in the rubber layer and has excellent flexibility and wear resistance can be obtained by using, as a nitrile rubber latex composition for forming a rubber layer, a latex composition in which a nitrile rubber having a specific weight average molecular weight is selected and the weight of methanol extractables in all solids present in the latex composition is controlled within a specific range. This finding has led to the completion of the present invention.

Specifically, the present invention provides a latex composition comprising:

a nitrile rubber containing an $\alpha,\beta$-ethylenically unsaturated nitrile monomer unit and a conjugated diene monomer unit, wherein the nitrile rubber has a weight average molecular weight of 50,000 to 100,000, and the weight of methanol extractables in all solids present in the latex composition is 2 to 20 wt % based on the weight of all the solids.

The latex composition according to the present invention preferably has a cumyl alcohol content of 10 to 10,000 ppm by weight based on the weight of all the solids present in the latex composition.

In the latex composition according to the present invention, the nitrile rubber preferably further comprises an ethylenically unsaturated acid monomer unit.

In the latex composition according to the present invention, the ethylenically unsaturated acid monomer unit is preferably carboxyl group-containing ethylenically unsaturated monomer unit.

The latex composition according to the present invention is preferably used to form a rubber layer on a fiber substrate.

The present invention also provides a laminate comprising a fiber substrate and a rubber layer laminated thereon, the fiber substrate comprising a plurality of fibers, the rubber layer being famed from the latex composition.

Effects of Invention

The present invention provides a latex composition which can provide a laminate having few or no cracks on the surface and having excellent flexibility and wear resistance.

BRIEF DESCRIPTION OF DRAWINGS

FIG. 1 shows a schematic view of a fiber substrate for use in the production of a laminate and a schematic view of a laminate.

DESCRIPTION OF EMBODIMENTS

The latex composition according to the present invention contains a nitrile rubber containing $\alpha,\beta$-ethylenically unsaturated nitrile monomer units and conjugated diene monomer units.

Examples of $\alpha,\beta$-ethylenically unsaturated nitrile monomers that can be used to form the $\alpha,\beta$-ethylenically unsaturated nitrile monomer units include, but are not limited to, ethylenically unsaturated compounds having a nitrile group and preferably having 3 to 18 carbon atoms. Examples of such $\alpha,\beta$-ethylenically unsaturated nitrile monomers include acrylonitrile, methacrylonitrile, halogen-substituted acrylonitriles, and the like. Among these, acrylonitrile is particularly preferred. Note that these $\alpha,\beta$-ethylenically unsaturated nitrile monomers may be used alone or in combination.

The proportion of the $\alpha,\beta$-ethylenically unsaturated nitrile monomer units contained in the nitrile rubber is preferably 10 to 45 wt %, more preferably 20 to 40 wt % of the total monomer units. Control of the proportion of the $\alpha,\beta$-ethylenically unsaturated nitrile monomer units within the above ranges results in a laminate which is further resistant to cracking and has further enhanced flexibility and wear resistance.

Preferred conjugated diene monomers for forming the conjugated diene monomer units are conjugated diene monomers having 4 to 6 carbon atoms such as 1,3-butadiene, isoprene, 2,3-dimethyl-1,3-butadiene, 1,3-pentadiene, chloroprene, and the like. 1,3-Butadiene and isoprene are more preferred, and 1,3-butadiene is particularly preferred. Note that these conjugated diene monomers may be used alone or in combination.

The proportion of the conjugated diene monomer units is preferably 40 to 80 wt %, more preferably 52 to 78 wt % of the total monomer units. Control of the proportion of the conjugated diene monomer units within the above ranges results in a laminate which is further resistant to cracking and has further enhanced flexibility and wear resistance.

The nitrile rubber may further contain ethylenically unsaturated acid monomer units. The additional presence of the ethylenically unsaturated acid monomer units in the nitrile rubber ensures high stability of the latex composition, and results in a laminate which is further resistant to cracking and has further enhanced flexibility and wear resistance. In particular, even when the latex composition contains additives such as zinc oxide, the presence thereof ensures sufficient stability of the latex composition.

Examples of ethylenically unsaturated acid monomers for forming the ethylenically unsaturated acid monomer units include, but are not limited to, carboxyl group-containing ethylenically unsaturated monomers, sulfonic acid group-containing ethylenically unsaturated monomers, phosphoric acid group-containing ethylenically unsaturated monomers, and the like.

Examples of the carboxyl group-containing ethylenically unsaturated monomers include, but are not limited to, ethylenically unsaturated monocarboxylic acids, such as acrylic acid, methacrylic acid, and crotonic acid; ethylenically unsaturated polyvalent carboxylic acids and anhydrides thereof, such as fumaric acid, maleic acid, itaconic acid, maleic anhydride, and itaconic anhydride; partially esterified products of ethylenically unsaturated polyvalent carboxylic acids, such as methyl maleate and methyl itaconate; and the like.

Examples of the sulfonic acid group-containing ethylenically unsaturated monomers include, but are not limited to, vinylsulfonic acid, methylvinyl sulfonic acid, styrenesulfonic acid, (meth)allylsulfonic acid, ethyl (meth)acrylate-2-sulfonate, 2-acrylamide-2-hydroxypropanesulfonic acid, and the like.

Examples of the phosphoric acid group-containing ethylenically unsaturated monomers include, but are not particularly limited to, propyl (meth)acrylate-3-chloro-2-phosphate, ethyl (meth)acrylate-2-phosphate, 3-allyloxy-2-hydroxypropane phosphoric acid, and the like.

These ethylenically unsaturated acid monomers may be used as alkali metal salts or ammonium salts, and may be used alone or in combination.

The proportion of the ethylenically unsaturated acid monomer units is preferably 2 to 15 wt %, more preferably 5 to 15 wt %, still more preferably 5 to 8 wt % of the total monomer units. Control of the proportion of the ethylenically unsaturated acid monomer units within the above ranges results in a laminate which is further resistant to cracking and has further enhanced flexibility and wear resistance.

Among the above ethylenically unsaturated acid monomers, the carboxyl group-containing ethylenically unsaturated monomers are preferred, the ethylenically unsaturated monocarboxylic acids are more preferred, and methacrylic acid is particularly preferred.

The proportion of the carboxyl group-containing ethylenically unsaturated monomer units is preferably 2 to 15 wt %, more preferably 5 to 15 wt %, still more preferably 5 to 8 wt % of the total monomer units. Control of the proportion of the carboxyl group-containing ethylenically unsaturated monomer units within the above ranges results in a laminate which is further resistant to cracking and has further enhanced flexibility and wear resistance.

The nitrile rubber may further contain other monomer units in addition to the ethylenically unsaturated nitrile monomer units and the conjugated diene monomer units described above.

Other monomers for forming the other monomer units may be any monomer that is copolymerizable with the conjugated diene monomer and the ethylenically unsaturated nitrile monomer. Examples thereof include, but are not limited to, the following monomers.

Specifically, examples of the other monomers include aromatic vinyl monomers such as styrene, α-methylstyrene, mono chlorostyrene, dichlorostyrene, trichloro styrene, mono methylstyrene, dimethylstyrene, trimethylstyrene, and hydroxymethylstyrene; ethylenically unsaturated carboxylic acid amide monomers such as acrylamide, methacrylamide, N,N-dimethylacrylamide, and N-methylolacrylamide; ethylenically unsaturated carboxylic acid alkyl ester monomers such as methyl (meth)acrylate, ethyl (meth)acrylate, butyl (meth)acrylate, and 2-ethylhexyl (meth)acrylate; carboxylic acid vinyl ester monomers such as vinyl acetate, vinyl propionate, and vinyl versatate; halogenated vinyl monomers such as vinyl chloride, vinylidene chloride, vinyl fluoride, and vinylidene fluoride; olefin monomers such as ethylene, propylene, 1-butene, and isobutene; vinyl ether monomers such as methyl vinyl ether, n-propyl vinyl ether, isobutyl vinyl ether, and dodecyl vinyl ether; (meth)allyl compounds such as allyl acetate, methallyl acetate, allyl chloride, and methallyl chloride; vinylsilyl compounds such as vinyltrimethoxysilane; vinyl pyridine and N-vinyl pyrrolidone; and the like. Among these, from the viewpoint of providing a laminate with further increased strength, aromatic vinyl monomers are preferred. These other monomers may be used alone or in combination.

In order to provide a laminate which is further resistant to cracking and has further enhanced flexibility and wear resistance, the proportion of the other monomer units contained in the nitrile rubber is preferably 26 wt % or less, more preferably 10 wt % or less, still more preferably 7 wt % or less, particularly preferably 5 wt % or less of the total monomer units.

The weight average molecular weight (Mw) of the nitrile rubber in the latex composition according to the present invention is 50,000 to 100,000, more preferably 55,000, to 95,000, further more preferably 60,000 to 90,000. Too low a weight average molecular weight of the nitrile rubber results in a laminate having poor wear resistance. In contrast, too high a weight average molecular weight thereof leads to insufficient control of cracking, and results in a laminate having poor flexibility.

The ratio (Mw/Mn) of the weight average molecular weight (Mw) to the number average molecular weight (Mn) of the nitrile rubber in the latex composition according to the present invention is preferably 1.5 to 4.0, more preferably 2.0 to 3.0. Control of the ratio (Mw/Mn) of the nitrile rubber within the above ranges results in a laminate which is further resistant to cracking and has further enhanced flexibility and wear resistance.

The weight average molecular weight (Mw) and the number average molecular weight (Mn) of the nitrile rubber can be determined as molecular weights calibrated against polystyrene standards by gel permeation chromatography using tetrahydrofuran as a developing solvent, for example. Examples of methods for controlling the weight average molecular weight and the ratio (Mw/Mn) of the nitrile rubber within the above ranges include, but are not limited to, a method of controlling reaction factors involved in the polymerization reaction (e.g., the amount of chain transfer agent to be used); and the like.

The weight of methanol extractables in all solids in the latex composition according to the present invention is 2 to 20 wt %, preferably 2 to 18 wt %, more preferably 2 to 15 wt % based on the weight of all the solids. The presence of such an amount of methanol extractables in the latex composition results in a laminate which has few or no cracks on the surface and has excellent flexibility and wear resistance.

The solids present in the latex compositions include the nitrile rubber and other solids such as emulsifier. The weight of methanol extractables in all the solids can be measured in the same manner as the method for measuring the weight of methanol extractables described later in Examples. Examples of methods for controlling the weight of methanol extractables within the above ranges include, but are not limited to, a method of adding a polymerization initiator in the late stage of the polymerization reaction, and the like.

The latex composition according to the present invention has a cumyl alcohol content of preferably 10 to 10,000 ppm by weight, more preferably 100 to 5,000 ppm by weight, still more preferably 200 to 4,000 ppm by weight based on the weight of all the solids present in the latex composition. The presence of such an amount of cumyl alcohol results in a laminate which is further resistant to cracking and has further enhanced flexibility and wear resistance.

The cumyl alcohol content can be measured in the same manner as the method for measuring the cumyl alcohol content described later in Examples. Examples of methods for controlling the cumyl alcohol content within the above ranges include, but are not limited to, a method of using cumene hydroperoxide as a polymerization initiator, and the like.

The latex composition according to the present invention has a methyl ethyl ketone insoluble matter content of preferably 49 to 88 wt %, more preferably 53 to 88 wt %, still more preferably 54 to 85 wt % based on the weight of all the solids present in the latex composition. The presence of such an amount of methyl ethyl ketone insoluble matter results in a laminate which is further resistant to cracking and has further enhanced flexibility and wear resistance.

The methyl ethyl ketone insoluble matter content can be measured in the same manner as the method for measuring the methyl ethyl ketone insoluble matter content described later in Examples. Examples of methods for controlling the methyl ethyl ketone insoluble matter content include, but are not limited to, a method of selecting an inorganic peroxide as a polymerization initiator used to initiate polymerization and cumene hydroperoxide as a polymerization initiator added in the course of polymerization, and the like.

The latex composition according to the present invention may further contain polymers other than the nitrile rubber. Examples of such polymers include natural rubber; conjugated diene rubbers obtained by polymerization or copolymerization of conjugated dienes such as butadiene and isoprene; and the like. Examples of such conjugated diene rubbers include isoprene rubber, styrene-butadiene rubber, chloroprene rubber, and the like.

Although not particularly limited thereto, the latex composition used in the present invention may be, for example, a nitrile rubber latex prepared by polymerizing a monomer mixture containing the above monomers. The latex composition may be a latex prepared through emulsion polymerization of the above monomer mixture, a latex prepared through phase inversion emulsification of a nitrile rubber solution prepared through solution polymerization of the above monomer mixture, or the like.

In the case of using a latex prepared through emulsion polymerization, the composition of the resulting nitrile rubber can be easily controlled by adjusting the composition of the monomer mixture used in emulsion polymerization. Any conventionally known method for emulsion polymerization can be used.

During emulsion polymerization of the above monomer mixture, ordinarily used polymerization additives, such as an emulsifier, a polymerization initiator, and a molecular weight modifier, can be used. These polymerization additives may be added in any manner, and any of initial single addition, portion-wise addition, continuous addition, and the like may be used.

One preferable production method is a latex composition production method including the steps of: initiating polymerization of the monomer mixture using a polymerization initiator; and adding an additional polymerization initiator in the course of polymerization. This method facilitates the production of a latex composition which can provide a laminate having few or no cracks on the surface and having excellent flexibility and wear resistance.

The timing of the addition of the polymerization initiator in the course of polymerization is when the conversion ratio of the monomer mixture reaches preferably 60 to 98%, more preferably 65 to 98%, still more preferably 70 to 98%. By selecting the timing of the addition of the polymerization initiator as described above, the weight of methanol extractables in all the solids can be controlled. Too early addition of the polymerization initiator tends to result in a laminate having poor wear resistance, while too late addition of the polymerization initiator tends to result in a laminate which is likely to have cracks and has poor flexibility. The conversion ratio can be determined by subtracting the weight of unreacted monomer mixture from the total weight of the monomer mixture used in polymerization and dividing the difference by the total weight of the monomer mixture used in polymerization, or by dividing the weight of the nitrile rubber by the total weight of the monomer mixture used in polymerization.

The polymerization initiators are preferably radical initiators, although not particularly limited thereto. Examples of the radical initiators include, but are not limited to, inorganic peroxides such as sodium persulfate, potassium persulfate, ammonium persulfate, potassium perphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; azo compounds such as azobisisobutyronitrile, azobis-2,4-dimethylvaleronitrile, and methyl azo bisisobutyrate; and the like. Among these, preferred are inorganic peroxides and organic peroxides, more preferred are inorganic peroxides, and particularly preferred are persulfates. In the case where a peroxide is used as the polymerization initiator, a combination thereof with a reducing agent such as sodium bisulfite, sodium hypochlorite, ferrous sulfate, or sodium formaldehyde sulfoxylate can be used as a redox polymerization initiator. Additionally, a chelating agent such as sodium ethylenediaminetetraacetate and a builder such as sodium carbonate or sodium sulfate may be used in combination therewith. These polymerization initiators may be used alone or in combination.

The amount of polymerization initiator to be used is preferably 0.01 parts by weight or more, more preferably 0.05 parts by weight or more, preferably 5 parts by weight or less, more preferably 2 parts by weight or less, still more preferably 1.5 parts by weight or less relative to 100 parts by weight of the total monomers to be used.

In the latex composition production method, the polymerization initiator used to initiate polymerization and the polymerization initiator added in the course of polymerization may be the same or different. Preferably, the polymerization initiator used to initiate polymerization and/or the polymerization initiator added in the course of polymerization is/are oil soluble. In order to appropriately and easily control the weight of methanol extractables in all the solids and the methyl ethyl ketone insoluble matter content and to obtain a laminate which is further resistant to cracking and has further enhanced flexibility and wear resistance, it is preferred that a water-soluble polymerization initiator be used as the polymerization initiator used to initiate polymerization, and an oil-soluble polymerization initiator be used as the polymerization initiator added in the course of polymerization. In this case, the amount of water-soluble polymerization initiator to be used is preferably 0.001 to 1.0 part by weight relative to 100 parts by weight of the total monomers to be used, and the amount of oil-soluble polymerization initiator to be used is preferably 0.01 to 0.5 parts by weight, more preferably 0.02 to 0.4 parts by weight relative to 100 parts by weight of the total monomers to be used.

Examples of the water-soluble polymerization initiator include the inorganic peroxides described above. Examples of the oil-soluble polymerization initiator include the organic peroxides and the azo compounds described above. Among these, an inorganic peroxide is preferably used as the polymerization initiator used to initiate polymerization, and an organic peroxide is used as the polymerization initiator added in the course of polymerization.

By using cumene hydroperoxide as a polymerization initiator, the cumyl alcohol content of the latex composition can be appropriately controlled within the above ranges, resulting in a laminate which is further resistant to cracking and has further enhanced flexibility and wear resistance. From this viewpoint, it is preferred that an inorganic peroxide be used as the polymerization initiator used to initiate polymerization, and cumene hydroperoxide be used as the polymerization initiator added in the course of polymerization. In this case, the amount of inorganic peroxide to be used is preferably 0.001 to 1.0 part by weight relative to 100 parts by weight of the total monomers, and the amount of cumene hydroperoxide to be used is preferably 0.01 to 0.5 parts by weight, more preferably 0.02 to 0.4 parts by weight relative to 100 parts by weight of the total monomers. In the case where cumene hydroperoxide is used, a combination thereof with a reducing agent such as sodium bisulfite, sodium hypochlorite, ferrous sulfate, or sodium formaldehyde sulfoxylate can be used as a redox polymerization initiator.

Examples of the emulsifier include, but are not limited to, anionic surfactants, nonionic surfactants, cationic surfactants, amphoteric surfactants, and the like. Among these, preferred are anionic surfactants such as alkylbenzene sulfonates, aliphatic sulfonates, sulfuric acid ester salts of higher alcohols, α-olefin sulfonates, and alkyl ether sulfuric acid ester salts.

The amount of emulsifier to be used is preferably 0.5 to 10 parts by weight, more preferably 1 to 8 parts by weight relative to 100 parts by weight of the total monomers to used.

Examples of the molecular weight modifier include, but are not to, α-methylstyrene dimer; mercaptans such as t-dodecylmercaptan, n-dodecylmercaptan, and octylmercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropyl xanthogen disulfide, and the like. Among these, mercaptans are preferred, and t-dodecylmercaptan is more preferred. These molecular weight modifiers may be used alone or in combination.

The amount of molecular weight modifier to be used varies depending on the type thereof. The amount thereof is preferably 0.1 to 1.5 parts by weight, more preferably 0.2 to 1.0 part by weight relative to 100 parts by weight of the total monomers to be used.

The emulsion polymerization is usually carried out in water. The amount of water to be used is preferably 80 to 500 parts by weight, more preferably 100 to 200 parts by weight relative to 100 parts by weight of the total monomers to be used.

In the emulsion polymerization, optionally, polymerization additives other than the above agents may be further used. Examples of such polymerization additives include chelating agents, dispersants, pH regulators, deoxidizing agents, particle size adjusting agents, and the like. The types and the amounts of those polymerization additives to be used are not particularly limited.

Examples of methods for adding the monomers include a method of adding the monomers used in the reaction vessel at a time, a method of continuously or intermittently adding the monomers according to the progress of polymerization, a method in which the reaction is carried out up to a specific conversion ratio by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, the monomers used may be mixed and then added to the reaction vessel, or each monomer may be individually added to the reaction vessel.

Any polymerization temperature during emulsion polymerization can be used without particular limitation. It is usually 0 to 95° C., preferably 5 to 70° C. Any polymerization time can be used without particular limitation. It is usually about 5 to 40 hours.

When the monomers are emulsion polymerized as described above to a predetermined polymerization conversion ratio, the polymerization reaction is stopped by cooling the polymerization system or by adding a polymerization terminator. The polymerization conversion ratio at which the polymerization reaction is stopped is typically 80% by weight or more, preferably 90% by weight or more.

The polymerization terminator may be any polymerization terminator usually used in emulsion polymerization. Specific examples thereof include, but are not limited to, hydroxylamine compounds such as hydroxylamine, hydroxylamine sulfate, diethylhydroxylamine, and hydroxylamine sulfonic acid and alkali metal salts thereof; sodium dimethyldithiocarbamate; hydroquinone derivatives; catechol derivatives; aromatic hydroxy dithiocarboxylic acid compounds such as aromatic hydroxy dithiocarboxylic acids (e.g., hydroxydimethyl benzene thiocarboxylic acid, hydroxydiethyl benzene dithiocarboxylic acid, and hydroxydibutyl benzene dithiocarboxylic acid) and alkali metal salts thereof; and the like.

The amount of polymerization terminator to be used is not particularly limited, but it is usually 0.05 to 2 parts by weight relative to 100 parts by weight of the total monomers to be used.

After stopping the polymerization reaction, if desired, unreacted monomers may be removed, and the solids content and pH may be adjusted.

The volume average particle size of nitrile rubber particles constituting the latex composition is typically 30 to 1000 nm, preferably 50 to 500 nm, more preferably 70 to 200 nm. As a result of controlling the volume average particle size of the nitrile rubber particles within the above ranges, the latex composition has appropriate viscosity and thus further improved handling properties, and can be formed into a rubber layer with improved moldability, resulting in a laminate with a more homogeneous rubber layer.

The solids content of the latex composition is usually 20 to 65% by weight, preferably 30 to 60% by weight, more preferably 35 to 55% by weight. By controlling the solids content of the latex composition within the above ranges, the transport efficiency of the latex can be improved, and the viscosity of the latex composition is controlled to an appropriate level, resulting in improved handling properties of the latex composition.

The pH of the latex composition is usually 5 to 13, preferably 7 to 10, more preferably 7.5 to 9. By controlling the pH of the latex composition within the ranges, the mechanical stability is improved, suppressing the occurrence of coarse agglomerates during transfer of the latex composition, and the viscosity of the latex composition is controlled to an appropriate level, resulting in improved handling properties of the latex composition.

To the latex composition used in the present invention may be further added a cross-linking agent, a crosslinking accelerator, zinc oxide, and the like.

The cross-linking agent is preferably a sulfur cross-linking agent. Examples of such sulfur cross-linking agents include, but are not limited to, sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azepinone-2), phosphorus-containing polysulfide, and polysulfide polymers; sulfur donating compounds such as tetramethylthiuram disulfide, selenium dimethyldithiocarbamate, and 2-(4'-moipholinodithio)benzothiazole; and the like. These cross-linking agents may be used alone or in combination.

The amount of sulfur cross-linking agent to be added is preferably 0.01 to 5 parts by weight, more preferably 0.05 to 3 parts by weight, particularly preferably 0.1 to 2 parts by weight relative to 100 parts by mass of the total solids in the latex composition. The use of the sulfur cross-linking agent in an amount within the above ranges results in a laminate which is further resistant to cracking and has further enhanced flexibility and wear resistance.

It is preferred that the sulfur cross-linking agent be dispersed in a solvent and be added as a dispersion. The addition of the sulfur cross-linking agent as a dispersion results in a laminate which is less likely to have defects, such as cracks, pin holes, and adhering agglomerates, in a resulting rubber layer.

Any method for preparing a dispersion of the sulfur cross-linking agent can be used. Preferred is a method involving adding a solvent to the sulfur cross-linking agent, and pulverizing and stirring the sulfur cross-linking agent with a wet pulverizer, such as a ball mill or a bead mill.

When sulfur is used as the sulfur cross-linking agent, it is preferably used together with a cross-linking accelerator (vulcanization accelerator) or zinc oxide.

Examples of the cross-linking accelerator (vulcanization accelerator) include, but are not limited to, dithiocarbamic acids and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbamoylthio)benzothiazole, 2-(2,6-dimethyl-4-morpholinothio) benzothiazole, 2-(4'-morpholino-dithio)benzothiazole, 4-morpholinyl-2-benzothiazyl disulfide, 1,3-bis(2-benzothiazyl-mercaptomethyl) urea, and the like. Among these, preferred are zinc diethyl dithiocarbamate, zinc dibutyl dithiocarbamate, 2-mercaptobenzothiazole, and zinc 2-mercaptobenzothiazole. These crosslinking accelerators may be used alone or in combination.

The amount of cross-linking accelerator to be used is preferably 0.1 to 10 parts by weight, more preferably 0.5 to 5 parts by weight relative to 100 parts by weight of the total solids in the latex composition.

The amount of zinc oxide to be used is preferably 5 parts by weight or less, more preferably 0.1 to 3 parts by weight, still more preferably 0.5 to 2 parts by weight relative to 100 parts by weight of the total solids in the latex composition.

In the case where the latex composition contains the cross-linking agent, the latex composition may be aged in advance (this process is also referred to as prevulcanization).

The temperature during the aging is preferably 20 to 50° C., although not particularly limited thereto. From the viewpoint of preventing peeling between the fiber substrate and the rubber layer and providing a laminate having improved wear resistance, the aging time is preferably 4 hours or more and 120 hours or less, more preferably 24 hours or more and 72 hours or less. By performing the aging for a time within the above ranges, the rubber layer is allowed to suitably permeate into the fiber substrate, which prevents peeling between the fiber substrate and the rubber layer and improves the wear resistance of the resulting laminate.

In order to control the viscosity of the latex composition within a desired range, a viscosity modifier may be added to the latex composition. Examples of the viscosity modifier include, but are not limited to, carboxymethyl cellulose thickeners, polycarbonic acid thickeners, polysaccharide thickeners, and the like. The viscosity of the latex composition is preferably 500 to 8000 m·Pa, more preferably 2500 to 7000 m·Pa. In particular, when the latex composition contains additives such as the above-described cross-linking agent, cross-linking accelerator, zinc oxide, and viscosity modifier, it is preferred that the viscosity of the latex composition be controlled within the above ranges.

To the latex composition may be added a filler such as carbon black, silica, calcium carbonate, aluminum silicate, magnesium silicate, calcium silicate, magnesium oxide, zinc (meth)acrylate, or magnesium (meth)acrylate. Optionally, predetermined amounts of various additives, such as an anti-aging agent, an antioxidant, a preservative, an antibacterial agent, a wetting agent, a dispersant, a pigment, a dye, a filler, a reinforcing material, and a pH regulator may be further added to the latex composition.

The latex composition containing the cross-linking agent has a solids content of preferably 25 to 55 wt %, more preferably 35 to 55 wt %. The latex composition containing the cross-linking agent preferably has a surface tension of 25 to 40 mN/m.

The latex composition according to the present invention can be used to form a rubber layer on a fiber substrate, thereby providing a laminate comprising the fiber substrate and the rubber layer. In particular, a laminate where a fiber substrate comprising a plurality of fibers and a rubber layer famed from the latex composition are laminated has few or no cracks on the surface and has excellent flexibility and wear resistance. For this reason, such a laminate can be suitably used as a glove such as a work glove. Namely, the latex composition according to the present invention may be a latex composition for forming a rubber layer on a fiber substrate.

In addition, the latex composition according to the present invention can be used to manufacture gloves. Namely, the latex composition according to the present invention may be a latex composition for gloves and may be a latex composition for work gloves. Additionally, such gloves may be gloves (protective gloves) comprising the above laminate.

The fiber substrate is not particularly limited as long as it is made of fibers. The following fibers can be used as constituent fibers for the fiber substrate: natural fibers such as cotton, hair, hemp, and wool; synthetic fibers such as polyester, polyurethane, acrylic, and nylon fibers; and the like. Among these, nylon is preferably used.

The fibers constituting the fiber substrate may be in the form of filaments (strings of fibers drawn out from the above natural fibers, synthetic fibers, or the like) or twisted yarns composed of a plurality of filaments, and may be in the form of a woven fabric or a non-woven fabric. Preferably, the fibers are twisted yarns.

The fiber substrate preferably has a thickness of 0.1 to 2.0 mm, although not particularly limited thereto. The fiber substrate preferably has a linear density of 50 to 500 denier, although not particularly limited thereto. The fiber substrate preferably has a gauge number of 7 to 18, although not particularly limited thereto. Here, the gauge number refers to the number of needles per 1 inch in a knitting machine.

In the above laminate, it is preferred that the rubber layer be famed covering the fiber substrate in a state where a portion of the rubber layer permeates between the fibers. FIGS. 1(A) and 1(B) are a schematic view of a fiber substrate and that of a laminate, respectively. FIG. 1(A) is a cross-sectional view of a fiber substrate. FIG. 1(B) is a cross-sectional view of a laminate comprising a rubber layer famed on the fiber substrate shown in FIG. 1(A). In the laminate shown in FIG. 1(B), the rubber layer is famed covering the fiber substrate in a state where a portion of the rubber layer has permeated between the fibers constituting the fiber substrate. In FIG. 1(B), in the rubber layer constituting the laminate, a portion of the rubber layer permeating from the surface of the fiber substrate into the gaps between the fibers is referred to as a permeated rubber layer, and in the rubber layer, a portion covering the fiber substrate from the surface of the fiber substrate is referred to as a surface rubber layer. Note that in the present invention, the rubber layer is described as being composed of a permeated rubber layer and a surface rubber layer as appropriate, but in general, the permeated rubber layer and the surface rubber layer are famed as one body.

In the above laminate, the permeated rubber layer has a thickness $t_1$ of preferably 50 to 600 μm, more preferably 100 to 550 μm, still more preferably 200 to 500 μm. When the thickness $t_1$ of the permeated rubber layer is controlled within the above ranges, the resulting laminate exhibits further enhanced durability when it is used as a glove (protective glove) such as a work glove.

In the above laminate, the thickness of the portion of the rubber layer covering the surface of the fiber substrate, in other words, the thickness $t_2$ of the surface rubber layer (shown in FIG. 1) is preferably 80 to 600 μm, more preferably 100 to 550 μm, still more preferably 150 to 500 μm, particularly preferably 200 to 500 μm. When the thickness $t_2$ of the surface rubber layer is controlled within the above ranges, the resulting laminate exhibits further enhanced durability when it is used as a glove (protective glove) such as a work glove. By using the latex composition according to the present invention, a laminate comprising a rubber layer having few or no cracks on the surface can be famed even when the rubber layer has a thickness of 150 μm or more, preferably 200 μm or more.

Although the thickness ratio between the permeated rubber layer and the surface rubber layer in the rubber layer is not particularly limited, the ratio ($t_2/t_1$) of the thickness $t_2$ of the surface rubber layer to the thickness $t_1$ of the permeated rubber layer is preferably 0.2 to 5, more preferably 0.3 to 2. When the thickness ratio between the permeated rubber layer and the surface rubber layer is controlled within the above ranges, the laminate exhibits highly balanced durability and flexibility when it is used as a work glove.

The thickness of the rubber layer as a whole, that is, the total of the thickness $t_1$ of the permeated rubber layer and the thickness $t_2$ of the surface rubber layer is preferably 150 μm or more, although not particularly limited thereto.

For example, the above laminate can be produced by a production method involving depositing a coagulant solution on the fiber substrate, and then contacting the latex composition with the fiber substrate with the coagulant solution deposit thereon to solidify the nitrile rubber, thereby forming a rubber layer on the fiber substrate. Alternatively, the laminate can be produced by a production method involving depositing the latex composition on the fiber substrate and then contacting the coagulant solution with the fiber substrate with the latex composition deposit thereon to solidify the nitrile rubber, thereby forming a rubber layer on the fiber substrate. In these methods, the rubber layer is famed to cover the fiber substrate in a state where a portion thereof has penetrated the fiber substrate. The rubber layer can be famed in a state where the fiber substrate is placed to cover a mold with a predetermined shape.

The coagulant solution is a solution of a coagulant dispersed or dissolved in a solvent.

The coagulant may be any coagulant which can cause the nitrile rubber in the latex composition to solidify. A metal salt or the like can be used, although not particularly limited thereto. Examples of constituent metal species for the metal salt include, but are not limited to, monovalent metals such as lithium, sodium, and potassium; divalent metals such as magnesium, calcium, zinc, iron, barium, zirconium, and copper; trivalent metals such as aluminum; and the like. Examples of constituent salt species for the metal salt include, but are not limited to, nitrate, sulfate, those of organic acids such as acetate, and the like. Among these, preferred metal species are polyvalent metals. Divalent metals are more preferred, and calcium is particularly preferred. Preferred salt species are nitrate and chloride, and nitrate is particularly preferred. In other words, the metal salt is preferably a polyvalent metal salt, and more preferably a divalent metal nitrate or a halide salt.

Specific examples of such metal salts include nitrates such as calcium nitrate, barium nitrate, and zinc nitrate; metal halide salts such as barium chloride, calcium chloride, magnesium chloride, zinc chloride, and aluminum chloride; acetates such as barium acetate, calcium acetate, and zinc acetate; sulfates such as calcium sulfate, magnesium sulfate, and aluminum sulfate; and the like. Among these, nitrates and metal halide salts are preferred, calcium nitrate and calcium chloride are more preferred, and calcium nitrate is particularly preferred.

These metal salts may be used alone or in combination.

The coagulant solution may further contain an organic acid in addition to the above coagulant. Preferred examples of the organic acid include, but are not limited to, organic acids having at least one group selected from a carboxyl group, a sulfo group, a hydroxy group, and a thiol group. Specific examples thereof include acetic acid, formic acid, propionic acid, citric acid, oxalic acid, and the like. Among these, acetic acid is preferred.

Examples of the solvent for dissolving or dispersing the coagulant include, but are not limited to, water, alcohols such as methanol and ethanol, mixtures thereof, and the like. Among these, water and alcohols are preferred, alcohols are more preferred, and methanol is particularly preferred.

The coagulant is present in the coagulant solution at a concentration of typically 0.2 to 50 wt %, preferably 0.2 to 10 wt %, more preferably 0.5 to 7.0 wt %.

Examples of methods for depositing the coagulant solution or the latex composition on the fiber substrate include, but are not limited to, a method of immersing the fiber substrate in the coagulant solution or the latex composition; and the like.

In the case where the fiber substrate is immersed in the coagulant solution or the latex composition, the immersion time is preferably 1 to 30 seconds, more preferably 1 to 10 seconds, although not particularly limited thereto.

In the case where the coagulant solution is deposited on the fiber substrate, it is preferred that the solvent in the coagulant solution be removed by drying after deposition. In this case, the drying temperature can be selected according to the solvent used, and is preferably 10 to 80° C., more preferably 15 to 70° C., although not particularly limited thereto. The drying time is preferably 1 second to 120 minutes, more preferably 5 seconds to 60 minutes, although not particularly limited thereto.

Likewise, it is preferred that after depositing the latex composition on the fiber substrate, the latex composition be dried. In this case, the drying temperature is preferably 180° C. or lower, more preferably 10 to 170° C., although not particularly limited thereto. The drying time is preferably 1 second to 60 minutes, more preferably 3 seconds to 30 minutes.

In the case where the latex composition is deposited on the fiber substrate and the latex composition deposit on the fiber substrate is then contacted with the coagulant solution, the drying is followed by contacting the latex composition deposit on the fiber substrate with the coagulant solution to cause the nitrile rubber in the latex composition to solidify, thereby forming a rubber layer. In this process, it is preferred that the coagulant solution be contacted with and deposited on the latex composition deposit on the fiber substrate, and then the solvent in the coagulant solution be removed by drying. In this case, the drying temperature can be selected according to the solvent used, and is preferably 10 to 80° C., more preferably 15 to 70° C., although not particularly limited thereto. The drying time is preferably 1 to 600 seconds, more preferably 5 to 300 seconds, although not particularly limited thereto.

When the coagulant solution or the latex composition is deposited on the fiber substrate, it is preferred that the fiber substrate be placed to cover a mold with a desired shape in advance, and the fiber substrate in this state be immersed in the coagulant solution or the latex composition.

The mold covered with the fiber substrate may be made of any of a variety of materials including, but not limited to, ceramics, glass, metals, plastics, and the like. The shape of the mold may be a desired shape corresponding to the shape of a final product. For example, in the case where the laminate is intended to be used as a protective glove, the mold covered with the fiber substrate is preferably a mold corresponding to any of a variety of types of gloves such as a mold having a shape from a wrist to finger tips, or the like.

In the case where the latex composition further contains the cross-linking agent, it is preferred that the nitrile rubber in the latex composition be cross-linked by heating the latex composition deposit on the fiber substrate.

The heating temperature for cross-linking is preferably 60 to 160° C., more preferably 80 to 150° C. By controlling the heating temperature within the above ranges, the time required for the cross-linking reaction can be shortened, thereby improving the productivity of the laminate. In addition, excessive heating which causes oxidative degradation of the nitrile rubber can be avoided, thereby improving the physical properties of the resulting laminate. Although the heating time for cross-linking may be appropriately selected according to the heating temperature, it is typically 5 to 120 minutes.

In the production method according to the present invention, after formation of the rubber layer on the fiber substrate, the rubber layer is preferably immersed in warm water at a temperature of 20 to 80° C. for 0.5 to 60 minutes to remove water-soluble impurities (such as the emulsifier, water-soluble polymers, and the coagulant) from the rubber layer. In the case where the latex composition contains the cross-linking agent, such an immersion treatment of the rubber layer in warm water is preferably performed before cross-linking the nitrile rubber in the rubber layer to more efficiently remove the water-soluble impurities although it may be performed after cross-linking the nitrile rubber in the rubber layer.

In addition, in the case where the rubber layer is famed in a state where the fiber substrate is placed on the mold, the laminate can be obtained by removing the fiber substrate having the rubber layer famed thereon from the mold. As a removal method, a method of peeling the laminate from the mold by hand or a method of peeling the laminate by water pressure or pressure of compressed air can be employed.

After removed from the mold, the laminate may be subjected to a heating treatment (post-cross-linking step) at 60 to 120° C. for 10 to 120 minutes. In addition, a surface-treatment layer may be famed on the inner surface and/or the outer surface of the laminate by a treatment such as a chlorinating treatment or a coating treatment.

The present invention can provide a laminate which is resistant to cracking and has excellent flexibility and wear resistance by using, as a nitrile rubber latex composition for forming a rubber layer, a latex composition which contains a nitrile rubber having a specific weight average molecular weight and contains a specific amount of methanol extractables in all solids present in the latex composition. Owing to these properties, the resulting laminate can be suitably used as work gloves, in particular, protective gloves for household, agricultural, fishery, and industrial use, and the like.

EXAMPLES

The present invention is hereinafter illustrated in specific detail with reference to Examples and Comparative Examples. In the following examples, all "parts" are on a weight basis unless otherwise indicated. The tests and the evaluations were performed according to the following methods.

Solids Content 2 g of a sample (weight: X2) was precisely weighed on an aluminum plate (weight: X1), and was dried in a hot air dryer at 105° C. for two hours. The sample was then cooled inside a desiccator, and the weight of the sample with the aluminum plate (weight: X3) was measured to calculate the solids content from the expression:

Solids content(wt %)=(X3−X1)×100/X2

Measurement of Content of 1,3-Butadiene Units

The content of 1,3-butadiene units was calculated by measuring the iodine value of each nitrile rubber (according to JIS K 6235).

Measurement of Content of Acrylonitrile Units

The content of acrylonitrile units was calculated by measuring the nitrogen content of each nitrile copolymer by the Kjeldahl method according to JIS K 6384.

Measurement of Content of Methacrylic Acid Units

A 2 mm square nitrile rubber with a weight of 0.2 g was combined with 100 ml of 2-butanone, and was stirred for 16 hours. Thereafter, 20 ml of ethanol and 10 ml of water were added thereto, and the resulting mixture was titrated, with stirring, with a 0.02 N hydrous ethanol solution of potassium hydroxide at room temperature in the presence of thymolphthalein as an indicator to determine the number of moles of carboxyl groups (unit: ephr) per 100 g of the nitrile rubber. The content of methacrylic acid units in the nitrile rubber was calculated by converting the determined number of moles into the amount of methacrylic acid units.

Weight of Methanol Extractables

Solids contained in each latex composition were chopped into 3 mm square pieces, and a 6 g portion was precisely weighed and dispersed in 50 ml methanol. Next, after extraction at 65° C. for 6 hours using a Soxhlet extractor, methanol was filtered and removed from the filtrate by evaporation. The residue was then dried in vacuo to yield methanol extractables (solids). The proportion by weight (unit: wt %) of the resulting methanol extractables to the solids before extraction was determined as the weight of methanol extractables.

Number Average Molecular Weight (Mn), Weight Average Molecular Weight (Mw), and Molecular Weight Distribution (Mw/Mn)

Each nitrile rubber was dissolved in tetrahydrofuran, and was passed through a membrane filter. The filtrate was measured by gel permeation chromatography under the conditions shown below to determine the number average molecular weight (Mn), the weight average molecular weight (Mw), and the molecular weight distribution (Mw/Mn) of the nitrile rubber. The number average molecular weight (Mn) and the weight average molecular weight (Mw) were calibrated against polystyrene standards.

Measurement device: "Alliance 2695" (available from Waters)

Column: two columns "Plgel Mini Mix-C GUARD" (product name) (available from Agilent Technologies) and "Plgel Mini Mix-C" (product name) (available from Agilent Technologies) connected in series Detector: differential refractometer RI Eluent: tetrahydrofuran Column temperature: 40° C.

Methyl Ethyl Ketone Insoluble Matter Content 40 g of a latex composition having a pH of 8 (adjusted with an ammonium aqueous solution) and a solids content of 30% was poured onto a glass plate (16 cm×23 cm) with a frame, and was left standing at 23° C. at a relative humidity of 50% for 5 days to form a film having a thickness of 0.2 to 0.3 mm. The film was chopped into 5 mm (length)×5 mm (width) pieces, which were then used as a sample. An about 0.2 g portion of the sample was weighed (weight A), was placed into an 80-mesh stainless steel basket, and was immersed in this state in 80 ml of methyl ethyl ketone (MEK) in a beaker. After left therein at 23° C. for 24 hours, the sample was pulled out, and the MEK absorbing insoluble matter in the basket was left in a room at 23° C. for one hour. Thereafter, the insoluble matter was dried at 105° C. for one hour, and the weight (C) of the dried insoluble matter was measured. The MEK insoluble matter content was determined based on the following expression:

MEK insoluble matter content=(C/A)×100(wt %)

Cumyl Alcohol Content

The cumyl alcohol content of each latex was determined by gas chromatography analysis using the device and the column shown below. The cumyl alcohol content was determined as the proportion (unit: ppm by weight) thereof to the solids content of the latex.

Device: "Agilent 6890" (product name, available from Agilent Technologies)

Column: "DB-1701" (product name, available from Agilent Technologies) Detector: FID Thickness $t_1$ of Permeated Rubber Layer and Thickness $t_2$ of Surface Rubber Layer For each of the gloves produced in Examples and Comparative Examples, the thickness $t_1$ of the permeated rubber layer and the thickness $t_2$ of the surface rubber layer were measured by observing a cross-section of the rubber layer taken in a palm portion at a position 12 cm away from the tip of the middle finger using an optical microscope (VHX-200, available from Keyence Corporation). Describing a specific measurement method with reference to FIG. 1, the thickness $t_1$ of the permeated rubber layer was determined by measuring the distance from the surface of the fiber substrate to the deepest portion of the permeated rubber at ten sites, and calculating the number average value of the measurement results. The thickness $t_2$ of the surface rubber layer was determined by measuring the distance from the surface of the fiber substrate to the surface of the rubber layer at ten sites, and calculating the number average value of the measurement results.

Appearance

The surfaces of the gloves produced in Examples and Comparative Examples were visually observed and evaluated according to the following criteria.

3: No cracks were observed.

2: A few cracks were observed.

1: A larger number of cracks were observed.

Flexibility

Each of the gloves produced in Examples and Comparative Examples was worn by ten people, and was evaluated according to the following evaluation criteria.

5: Soft

4: Moderate

3: Slightly Hard

2: Hard

1: Very hard

Wear Resistance

A wear test was conducted, and the evaluation was performed using Martindale abrasion tester (product name: "STM 633", available from SATRA Technology) according to a method described in EN 388. Specifically, each of the gloves produced in Examples and Comparative Examples was repeatedly rubbed while a predetermined weight was applied thereto. The number of times of rubbing before breakage of the glove was obtained. According to the number of times of rubbing before breakage of the glove, the gloves were classified into any one of LEVEL 0 to LEVEL 4. The higher the level, the better the wear resistance.

LEVEL 4: The number of rotations is 8,000 or more rotations.
LEVEL 3: The number of rotations is 2,000 or more and less than 8,000 rotations.
LEVEL 2: The number of rotations is 500 or more and less than 2,000 rotations.
LEVEL 1: The number of rotations is 100 or more and less than 500 rotations.
LEVEL 0: The number of rotations is less than 100 rotations.

Example 1

Preparation of Latex Composition

Into a pressure resistant polymerization reactor with a stirrer, 30.0 parts of acrylonitrile, 5.5 parts of methacrylic acid, 0.5 parts of t-dodecylmercaptan as a molecular weight modifier, 150 parts of deionized water, 2.5 parts of sodium dodecylbenzene sulfonate, and 0.5 parts of the sodium salt of β-naphthalene sulfonic acid-formaldehyde condensate were placed. The air therein was replaced by nitrogen three times, and then 64.5 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. When the polymerization conversion ratio reached 90%, 0.04 parts of cumene hydroperoxide, 0.005 parts of ferrous sulfate, and 0.003 parts of sodium formaldehyde sulfoxylate were added. The polymerization reaction was continued until the polymerization conversion ratio reached 97%. Thereafter, 0.1 parts of diethylhydroxylamine was added to terminate the polymerization reaction. Thus, a nitrile rubber latex (A1) was obtained.

The pH and the solids content of the resulting latex (A1) were adjusted to provide a latex composition having a solids content of 40 wt % and a pH of 8. The contents of the respective monomer units, the number average molecular weight (Mn), the weight average molecular weight (Mw), and the molecular weight distribution (Mw/Mn) of the nitrile rubber were measured according to the methods described above. Further, the MEK insoluble matter content, the weight of methanol extractables, and the cumyl alcohol content of the resulting latex composition were measured according to the methods described above. The results are shown in Table 1.

For 100 parts of the nitrile rubber in the latex composition, aqueous dispersions of additives respectively containing 1.0 part of colloidal sulfur (available from Hosoi Chemical Industry Co., Ltd.), 1.0 part of zinc dibutyldithiocarbamate (available from OUCHI SHINKO CHEMICAL INDUSTRIAL CO., LTD.), 1.5 parts of zinc oxide, and 3.0 parts of titanium dioxide were prepared (all the amounts are on a solids basis). The aqueous dispersions prepared were added to the latex composition. In the process of adding the aqueous dispersions of the additives, predetermined amounts thereof were slowly added while the latex composition was being stirred. After the additives were homogeneously mixed, carboxymethyl cellulose as a viscosity modifier was added to adjust the viscosity of the latex composition to 3000 mPa·s.

Preparation of Coagulant Solution

A coagulant solution was prepared by dissolving 1.0 wt % of calcium nitrate as a coagulant in methanol.

Production of Glove

First, the latex composition prepared above was aged (prevulcanized) at 30° C. for 48 hours. Next, a glove-shaped ceramic mold covered with a glove-shaped fiber substrate (material: nylon, average thickness d of substrate layer in fiber substrate: 720 μm, linear density: 300 denier) was immersed in the coagulant solution for 2 seconds. The mold was then pulled from the coagulant solution, and was dried at 30° C. for 1 minute. Subsequently, the glove-shaped ceramic mold was immersed in the latex composition for 2 seconds, and was then pulled from the latex composition. Thereafter, the mold was dried at 30° C. for 30 minutes, and then at 70° C. for 10 minutes, thereby forming a rubber layer on the fiber substrate. Next, the glove-shaped ceramic mold with the rubber layer famed thereon was immersed in warm water at 60° C. for 90 seconds to cause water-soluble impurities to elute from the rubber layer. Thereafter, the mold was dried at 30° C. for 10 minutes, and then was subjected to thermal treatment at 125° C. for 30 minutes to cross-link the acrylic rubber in the rubber layer. The fiber substrate with the rubber layer famed thereon was peeled from the glove-shaped ceramic mold. Thus, a glove (laminate) was obtained. According to the above-described methods, the obtained glove (laminate) was examined to determine the thickness $t_1$ of the permeated rubber layer and the thickness $t_2$ of the surface rubber layer and to evaluate the appearance, the flexibility, and the wear resistance. The results are shown in Table 1.

Example 2

Preparation of Latex

Into a pressure resistant polymerization reactor with a stirrer, 30.0 parts of acrylonitrile, 5.5 parts of methacrylic acid, 0.5 parts of t-dodecylmercaptan as a molecular weight modifier, 150 parts of deionized water, 2.5 parts of sodium dodecylbenzene sulfonate, and 0.5 parts of the sodium salt of β-naphthalene sulfonic acid-formaldehyde condensate were placed. The air therein was replaced by nitrogen three times, and then 64.5 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. When the polymerization conversion ratio reached 90%, 0.005 parts of cumene hydroperoxide, 0.005 parts of ferrous sulfate, and 0.003 parts of sodium formaldehyde sulfoxylate were added. The polymerization reaction was continued until the polymerization conversion ratio reached 97%. Thereafter, 0.1 parts of diethylhydroxylamine was added to terminate the polymerization reaction. Thus, a nitrile rubber latex (A2) was obtained.

A latex composition was obtained in the same manner as in Example 1 except that the nitrile rubber latex (A2) prepared above was used. The latex composition was evaluated in the same manner as above. The results are shown in Table 1.

Example 3

Preparation of Latex

Into a pressure resistant polymerization reactor with a stirrer, 30.0 parts of acrylonitrile, 5.5 parts of methacrylic acid, 0.5 parts of t-dodecylmercaptan as a molecular weight modifier, 150 parts of deionized water, 2.5 parts of sodium dodecylbenzene sulfonate, and 0.5 parts of the sodium salt of β-naphthalene sulfonic acid-formaldehyde condensate were placed. The air therein was replaced by nitrogen three times, and then 64.5 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. When the polymerization conversion ratio reached 90%, 0.1 parts of cumene hydroperoxide, 0.005 parts of ferrous sulfate, and 0.003 parts of sodium formaldehyde sulfoxylate were added. The polymerization reaction was continued until the polymerization conversion ratio reached 97%. Thereafter, 0.1 parts of diethylhydroxylamine was added to terminate the polymerization reaction. Thus, a nitrile rubber latex (A3) was obtained.

A latex composition was obtained in the same manner as in Example 1 except that the nitrile rubber latex (A3) prepared above was used. The latex composition was evaluated in the same manner as above. The results are shown in Table 1.

Comparative Example 1

Preparation of Latex

Into a pressure resistant polymerization reactor, 30.0 parts of acrylonitrile, 5.5 parts of methacrylic acid, 0.5 parts of t-dodecylmercaptan as a molecular weight modifier, 150 parts of deionized water, and 2.5 parts of sodium dodecylbenzene sulfonate were placed. The air therein was replaced by nitrogen three times, and then 64.5 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. The polymerization reaction was continued until the polymerization conversion ratio reached 97%. Thereafter, 0.1 parts of diethylhydroxylamine was added to terminate the polymerization reaction. Thus, a nitrile rubber latex (A4) was obtained.

A latex composition was obtained in the same manner as in Example 1 except that the nitrile rubber latex (A4) prepared above was used. The latex composition was evaluated in the same manner as above. The results are shown in Table 1.

Comparative Example 2

Preparation of Latex

Into a pressure resistant polymerization reactor with a stirrer, 30.0 parts of acrylonitrile, 5.5 parts of methacrylic acid, 0.5 parts of t-dodecylmercaptan as a molecular weight modifier, 150 parts of deionized water, 2.5 parts of sodium dodecylbenzene sulfonate, and 0.5 parts of the sodium salt of β-naphthalene sulfonic acid-formaldehyde condensate were placed. The air therein was replaced by nitrogen three times, and then 64.5 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. When the polymerization conversion ratio reached 90%, 1.1 parts of cumene hydroperoxide, 0.005 parts of ferrous sulfate, and 0.003 parts of sodium formaldehyde sulfoxylate were added. The polymerization reaction was continued until the polymerization conversion ratio reached 97%. Thereafter, 0.1 parts of diethylhydroxylamine was added to terminate the polymerization reaction. Thus, a nitrile rubber latex (A5) was obtained.

A latex composition was obtained in the same manner as in Example 1 except that the nitrile rubber latex (A5) prepared above was used. The latex was evaluated in the same manner as above. The results are shown in Table 1.

Comparative Example 3

Preparation of Latex

Into a pressure resistant polymerization reactor with a stirrer, 26.0 parts of acrylonitrile, 18.0 parts of methacrylic acid, 0.5 parts of t-dodecylmercaptan as a molecular weight modifier, 150 parts of deionized water, 2.5 parts of sodium dodecylbenzene sulfonate, and 0.5 parts of the sodium salt of β-naphthalene sulfonic acid-formaldehyde condensate were placed. The air therein was replaced by nitrogen three times, and then 56.0 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. When the polymerization conversion ratio reached 90%, 0.02 parts of cumene hydroperoxide, 0.005 parts of ferrous sulfate, and 0.003 parts of sodium formaldehyde sulfoxylate were added. The polymerization reaction was continued until the polymerization conversion ratio reached 97%. Thereafter, 0.1 parts of diethylhydroxylamine was added to terminate the polymerization reaction. Thus, a nitrile rubber latex (A6) was obtained.

A latex composition was obtained in the same manner as in Example 1 except that the nitrile rubber latex (A6) prepared above was used. The latex composition was evaluated in the same manner as above. The results are shown in Table 1.

TABLE 1

|  |  | Example 1 | Example 2 | Example 3 | Comparative Example 1 | Comparative Example 2 | Comparative Example 3 |
|---|---|---|---|---|---|---|---|
|  |  | Latex Nitrile rubber | | | | | |
| Composition | Acrylonitrile unit (wt %) | 30.0 | 30.0 | 30.0 | 30.0 | 30.0 | 26.0 |
|  | 1,3-Butadiene unit (wt %) | 64.5 | 64.5 | 64.5 | 64.5 | 64.5 | 56.0 |
|  | Methacrylic acid unit (wt %) | 5.5 | 5.5 | 5.5 | 5.5 | 5.5 | 18.0 |
| Molecular weight | Number average molecular weight (Mn) | 32,500 | 45,000 | 25,000 | 58,000 | 12,000 | 80,000 |

TABLE 1-continued

|  |  | Example 1 | Example 2 | Example 3 | Comparative Example 1 | Comparative Example 2 | Comparative Example 3 |
|---|---|---|---|---|---|---|---|
|  | Weight average molecular weight (Mw) | 76,000 | 95,000 | 60,000 | 186,200 | 48,000 | 120,000 |
|  | Molecular weight distribution (Mw/Mn) | 2.3 | 2.1 | 2.4 | 3.2 | 4.0 | 1.5 |
| MEK insoluble matter content (wt %) |  | 55.0 | 51.0 | 60.0 | 50.0 | 90.0 | 2.0 |
| Amount of methanol extractables (wt %) |  | 7.9 | 7.0 | 7.4 | 6.0 | 1.8 | 21.0 |
| Cumyl alcohol content (ppm by weight) |  | 400 | 50 | 1,000 | 0 | 11,000 | 200 |
| Laminate | | | | | | | |
| Average thickness d (μm) of substrate layer |  | 720 | 720 | 720 | 720 | 720 | 720 |
| Average thickness t (μm) of laminate |  | 920 | 918 | 923 | 920 | 917 | 925 |
| Average thickness $t_1$ (μm) of permeated rubber layer |  | 240 | 242 | 237 | 240 | 243 | 235 |
| Average thickness $t_2$ (μm) of surface rubber layer |  | 200 | 198 | 203 | 200 | 197 | 205 |
| Evaluations | | | | | | | |
| Appearance |  | 3 | 3 | 3 | 1 | 1 | 3 |
| Flexibility |  | 5 | 5 | 4 | 4 | 3 | 2 |
| Wear resistance | Number of rotations (rpm) | 12,000 | 14,000 | 10,000 | 16,000 | 8,000 | 2,000 |
|  | LEVEL | 4 | 4 | 4 | 4 | 4 | 3 |

As shown in Table 1, laminates having no visible cracks and having excellent flexibility and wear resistance could be obtained using the latex compositions in which a nitrile rubber having a weight average molecular weight of 50,000 to 100,000 was present and the weight of methanol extractables in all solids present therein was 2 to 20 wt % based on the weight of all the solids (Examples 1 to 3).

In contrast, the laminate obtained using the latex composition containing the nitrile rubber having a weight average molecular weight of more than 100,000 had a large number of cracks (Comparative Example 1).

The laminate obtained using the latex composition in which the weight of methanol extractables in all solids present in the latex composition was less than 2 wt % based on the weight of all the solids had a large number of cracks and had poor flexibility (Comparative Example 2).

The laminate obtained using the latex composition which contains the nitrile rubber having a weight average molecular weight of more than 100,000 and in which the weight of methanol extractables in all solids present in the latex composition was more than 20 wt % based on the weight of all the solids had poor flexibility and wear resistance (Comparative Example 3).

The invention claimed is:

1. A latex composition comprising:
   a nitrile rubber containing an α,β-ethylenically unsaturated nitrile monomer unit and a conjugated diene monomer unit,
   wherein the nitrile rubber has a weight average molecular weight of 50,000 to 100,000, and
   the weight of methanol extractables in all solids present in the latex composition is 2 to 20 wt % based on the weight of all the solids.

2. The latex composition according to claim 1,
   wherein the latex composition has a cumyl alcohol content of 10 to 10,000 ppm by weight based on the weight of all the solids present in the latex composition.

3. The latex composition according to claim 1, wherein the nitrile rubber further comprises an ethylenically unsaturated acid monomer unit.

4. The latex composition according to claim 3,
   wherein the ethylenically unsaturated acid monomer unit is a carboxyl group-containing ethylenically unsaturated monomer unit.

5. A laminate comprising a fiber substrate and a rubber layer laminated thereon, the fiber substrate comprising a plurality of fibers, the rubber layer being formed from the latex composition according to claim 1.

* * * * *